US009917288B2

(12) United States Patent
Schubert et al.

(10) Patent No.: US 9,917,288 B2
(45) Date of Patent: Mar. 13, 2018

(54) LITHIUM IRON DISULFIDE BATTERY

(71) Applicant: Energizer Brands, LLC, St. Louis, MO (US)

(72) Inventors: Mark A. Schubert, Medina, OH (US); Matthew T. Wendling, Avon, OH (US); Weiwei Huang, Westlake, OH (US)

(73) Assignee: Energizer Brands, LLC, St. Louis, MO (US)

( * ) Notice: Subject to any disclaimer, the term of this patent is extended or adjusted under 35 U.S.C. 154(b) by 135 days.

(21) Appl. No.: 13/650,417

(22) Filed: Oct. 12, 2012

(65) Prior Publication Data

US 2013/0095358 A1     Apr. 18, 2013

Related U.S. Application Data

(60) Provisional application No. 61/546,762, filed on Oct. 13, 2011.

(51) Int. Cl.
*H01M 2/16* (2006.01)
*H01M 2/18* (2006.01)
*H01M 6/16* (2006.01)

(52) U.S. Cl.
CPC ......... *H01M 2/1686* (2013.01); *H01M 2/162* (2013.01); *H01M 2/1653* (2013.01); *H01M 6/16* (2013.01)

(58) Field of Classification Search
CPC ........ H01M 4/136; H01M 2/14–2/185; H01M 6/00–6/02; H01M 6/14–6/20
See application file for complete search history.

(56) References Cited

U.S. PATENT DOCUMENTS

| 5,472,808 | A | 12/1995 | Peled et al. | |
|---|---|---|---|---|
| 5,639,573 | A * | 6/1997 | Oliver | H01M 2/1653 429/303 |
| 6,586,138 | B2 * | 7/2003 | Pekala | H01M 2/162 429/247 |
| 6,803,139 | B2 | 10/2004 | Saito et al. | |
| 7,754,387 | B2 | 7/2010 | Harada et al. | |
| 2005/0233214 | A1 | 10/2005 | Marple et al. | |
| 2005/0244706 | A1 | 11/2005 | Wu et al. | |
| 2006/0073385 | A1 | 4/2006 | Andrin et al. | |

(Continued)

FOREIGN PATENT DOCUMENTS

| JP | 2009 123484 A | 6/2009 |
|---|---|---|
| WO | 2004/038831 A2 | 5/2004 |
| WO | 2005/018070 A1 | 2/2005 |

OTHER PUBLICATIONS

Wu, Y. et al. (Ed.). (2015). Lithium-Ion Batteries: Fundamentals and Applications. CRC Press. pp. 461-478. doi:10.1201/b18427-14.*

(Continued)

*Primary Examiner* — Jonathan Crepeau
*Assistant Examiner* — Jacob Buchanan
(74) *Attorney, Agent, or Firm* — Alston & Bird LLP

(57) ABSTRACT

A lithium-iron disulfide battery with improved high temperature performance is disclosed. The separator characteristics are deliberately selected to be compatible with the electrolyte at the intended temperature. Additional or alternative modifications can be made in the form of a scaffold or laminated structure. A preferred polymer for such separators is polyimide.

14 Claims, 5 Drawing Sheets

(56) References Cited

U.S. PATENT DOCUMENTS

| | | | |
|---|---|---|---|
| 2007/0178376 A1 | 8/2007 | Fujikawa et al. | |
| 2007/0196638 A1 | 8/2007 | Wei et al. | |
| 2007/0232175 A1* | 10/2007 | Katayama | D01F 6/805 |
| | | | 442/364 |
| 2007/0281206 A1 | 12/2007 | Fujikawa et al. | |
| 2008/0118827 A1 | 5/2008 | Call et al. | |
| 2008/0254343 A1 | 10/2008 | Kaplin et al. | |
| 2009/0011337 A1* | 1/2009 | Kajita et al. | 429/249 |
| 2009/0026662 A1* | 1/2009 | Yun et al. | 264/466 |
| 2009/0061293 A1* | 3/2009 | Webber | 429/94 |
| 2009/0104520 A1 | 4/2009 | Marple | |
| 2009/0136834 A1* | 5/2009 | Coowar | H01M 2/0267 |
| | | | 429/127 |
| 2009/0297949 A1 | 12/2009 | Berkowitz et al. | |
| 2010/0068612 A1 | 3/2010 | NIshikawa | |
| 2010/0124701 A1* | 5/2010 | Naoi et al. | 429/144 |
| 2010/0178567 A1 | 7/2010 | Hauser et al. | |
| 2010/0233523 A1 | 9/2010 | Jo et al. | |
| 2010/0304205 A1 | 12/2010 | Jo et al. | |
| 2011/0104474 A1 | 5/2011 | Liu et al. | |
| 2014/0255790 A1* | 9/2014 | Matteucci | C08J 9/0066 |
| | | | 429/252 |

OTHER PUBLICATIONS

Patent Cooperation Treaty (PCT), International Search Report and Written Opinion for Application No. PCT/US2012/059894, filed Oct. 12, 2012, dated Nov. 23, 2012, European Patent Office, Netherlands.

Ardel, G., et al. "Rechargeable lithiumlhybrid-electrolytelpyrite battery", Journal of Power Sources, Elsevier SA, CH, vol. 110, No. 1, Jul. 20, 2002; pp. 152-162.

Owens, Boone B., et al., "Ch. 15: Solid-Electrolyte Batteries," "Handbook of Batteries: Third Edition," Aug. 30, 2001, Linden, Reddy, editors, pp. 15.1-15.25, The McGraw-Hill Companies.

State Intellectual Property Office of the P.R.C., Third Office Action for Application No. 201280049434.X, dated Sep. 29, 2016, 8 pages, China.

Austrialian Government, IP Australia, Patent Examination Report No. 1 for Application No. 2012322630, dated Nov. 3, 2016, 4 pages, Australia.

Austrialian Government, IP Australia, Patent Examination Report No. 2 for Application No. 2012322630, dated Sep. 7, 2017, 3 pages, Australia.

State Intellectual Property Office of the P.R.C., Fourth Office Action for Application No. 201280049434.X, dated Mar. 6, 2017, 8 pages, China.

* cited by examiner

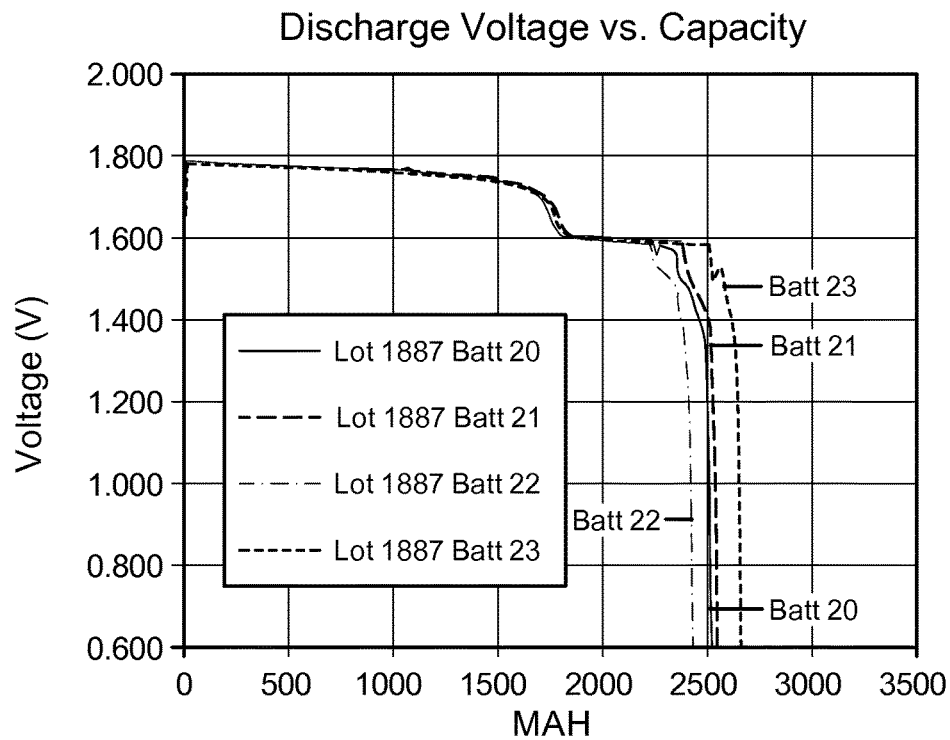
FIGURE 2A  PE control
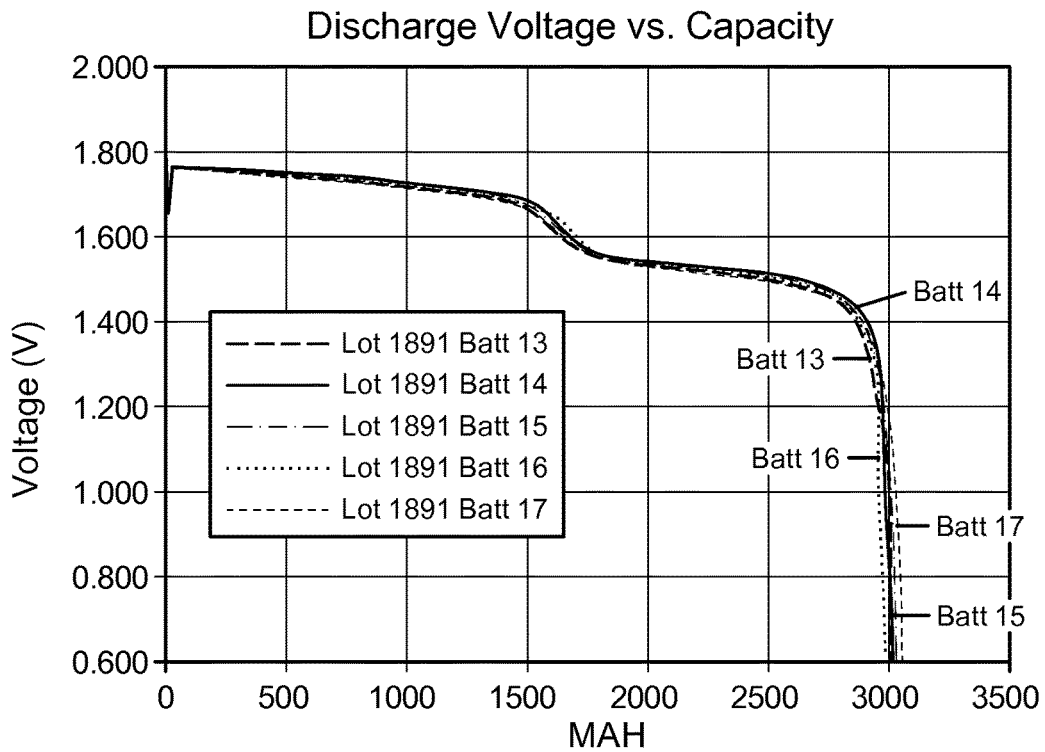
FIGURE 2B  Cathode/PE-PI/Anode

LITHIUM IRON DISULFIDE BATTERY

FIELD OF THE INVENTION

The present invention relates to a lithium iron disulfide battery. In particular, certain improvements to the polymeric separator and electrolyte formulation are described.

BACKGROUND OF THE INVENTION

Electrochemical cells are presently the preferred method of providing cost effective portable power for a wide variety of consumer devices. The consumer device market dictates that only a handful of standardized cell sizes (e.g., AA, AAA or AAAA) and specific nominal voltages (e.g., 1.5 V) be provided, while more and more consumer electronic devices, such as digital still cameras, are being designed with relatively high power operating requirements. Despite these constraints, consumers often prefer and opt to use primary batteries for their convenience, reliability, sustained shelf life and more economical per unit price as compared to currently available rechargeable (i.e., secondary) batteries.

Within this context, it is readily apparent that design choices for primary non-rechargeable) battery manufacturers are extremely limited. For example, specified, nominal voltages for standard consumer products significantly limits the selection of potential electrochemical materials in batteries, while the use of standard cell sizes restricts the overall available internal volume available for active materials, safety devices and other elements. Taken together, these choices have made 1.5 V primary battery systems, such as alkaline or lithium-iron disulfide systems, far more prominent than others, such as 3.0 V and higher lithium-manganese dioxide.

However, considerations in designing 1.5V primary batteries are significantly different are considerably different than higher voltage and/or rechargeable systems. For example, some battery chemistries (e.g., alkaline and nickel oxy-hydroxide) rely on an aqueous and highly caustic electrolyte that has a propensity for gas expansion and/or leakage, leading to designs, in terms of selection of internal materials and/or compatibility with containers and closures, that are very different than other chemistries (e.g., lithium-iron disulfide). Further, in rechargeable 1.5 V systems (note that lithium-iron disulfide systems are not currently considered suitable for consumer-based rechargeable systems), highly specialized electrochemical compositions are used, although these high cost components are deemed acceptable because secondary systems typically sell for a higher retail price than their primary battery equivalents. Additionally, the discharge mechanisms, cell designs and safety considerations of rechargeable systems are, by and large, inconsequential and/or inapplicable to primary systems.

Within the realm of 1.5 V systems, lithium-iron disulfide batteries (also referred to as $LiFeS_2$, lithium pyrite or lithium iron pyrite) offer higher energy density, especially at high drain rates, as compared to alkaline, carbon zinc or other 1.5 V battery chemistries. But even with the inherent advantages of lithium-iron disulfide cells for high power devices, $LiFeS_2$ cell designs must strike a balance between the cost of materials used, the incorporation of necessary safety devices and the overall reliability, delivered capacity and expected conditions for use of the cell (e.g., temperature, drain rate, etc.). Normally, low power designs emphasize the quantity of active materials, while high power designs focus more on configurations to enhance discharge efficiency. As an added consideration, iron-disulfide's propensity to expand significantly during discharge, in comparison to other batteries, coupled with its relatively hard and granular nature in slurry- and/or roll-coated electrodes, puts extreme stresses on the separator and other cell components during discharge which, if the compromised, could cause the cell to fail to deliver its designed capacity.

Safety devices, such as venting mechanisms and thermally activated "shutdown" elements, and improvements in discharge reliability (e.g., by preventing internal short circuits) occupy internal cell volume and involve design considerations that are usually counterproductive to cell internal resistance, efficiency and discharge capacity. An additional challenge is presented by transportation regulations, which limit the amount of weight lithium batteries can lose during thermal cycling—meaning that cell designs for smaller container sizes like AA and AAA can only lose milligrams of total cell weight (usually by way of evaporation of the electrolyte). Lastly, the reactive and volatile nature of the non-aqueous, organic electrolytes required for $LiFeS_2$ cells severely limits the universe of potential materials available (particularly with respect to interactions between the electrolyte and cell closure, separator and/or current collector(s) provided within the cell) as compared to other electrochemical systems.

With these considerations in mind, a lithium-iron disulfide battery is desired which will reliably deliver its fully designed discharge capacity at temperatures exceeding 70° C. is desired.

BRIEF DESCRIPTION OF THE DRAWINGS

The invention will be better understood and other features and advantages will become apparent by reading the Detailed Description of the Invention, taken together with the drawings, wherein:

FIGS. 2A-2D illustrate the discharge performance of various separator combinations, with FIG. 2A specifically illustrating the premature voltage dropoff problem in prior art cells that is specifically addressed and solved by certain embodiments of the invention. To further clarify, premature voltage dropoff occurs when the discharge voltage for a cell discharged under appropriate conditions drops (and without any subsequent recovery in intermittent test regimes) and is coupled with a discernible, concurrent exothermic event within the cell. Usually, the voltage drop is unexpected (in comparison to the rated cell capacity and/or depth of discharge) and often approaches or drops below the cutoff voltage for the test at issue. In the same manner, the exothermic event may be observed on the exterior of the cell housing and typically appears as a deviation from the observed temperature trend exhibited by the cell up until that point in the test. Alternatively, in a set of identically constructed cells, premature voltage dropoff might be indicated when the discharge capacity delivered by the cells discharged under identical conditions varies by more than 10% between cells within the set.

DETAILED DESCRIPTION OF CERTAIN EMBODIMENTS OF THE INVENTION

Figure 1:
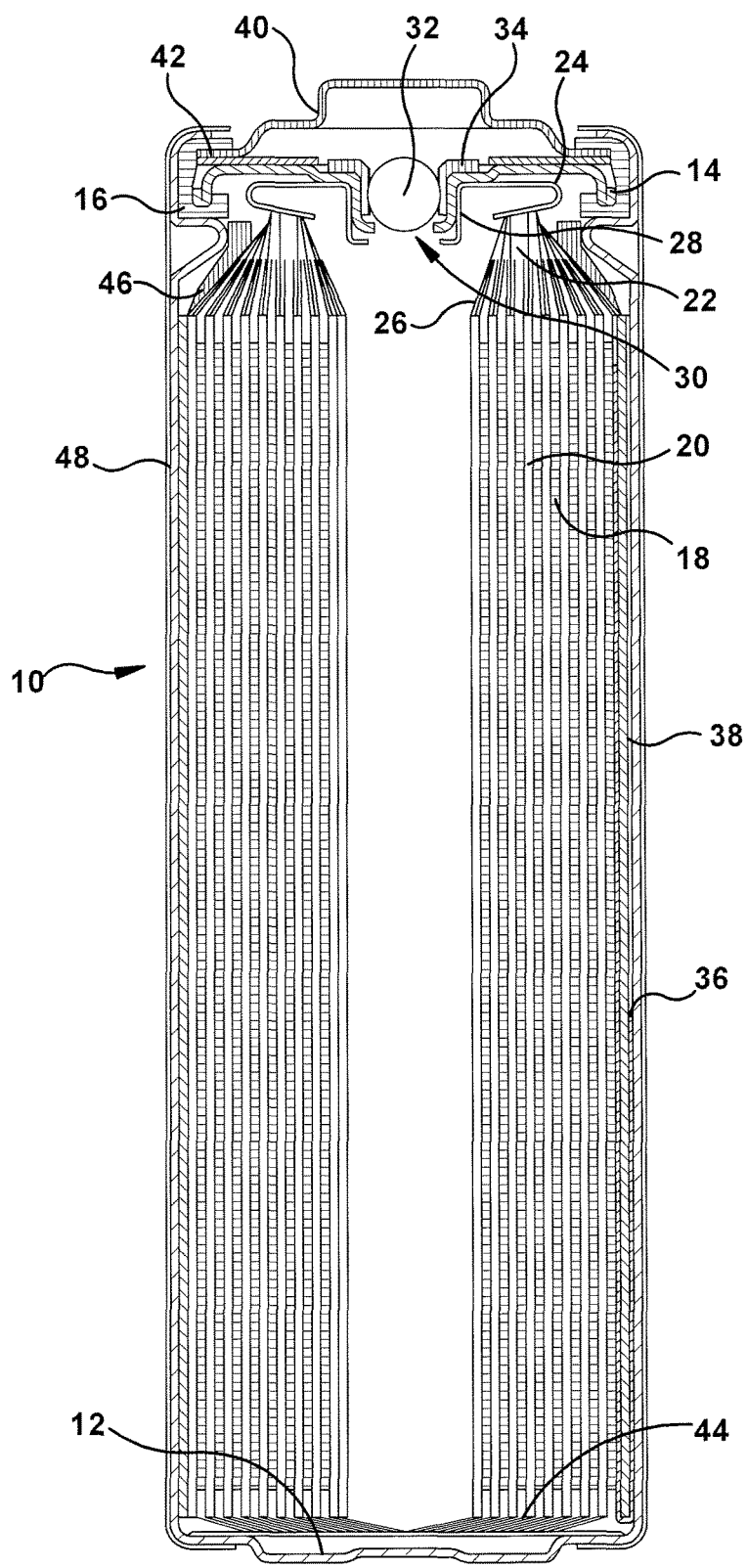
FIG. 1 is a cross-sectional elevational view of one embodiment of an electrochemical cell of the present invention. Note that the liquid electrolyte itself is not shown. Typically much, and in some cases most, of the electrolyte is absorbed into the structures of one or both electrodes and the separator material. In addition, there may be an excess pool of electrolyte at the bottom of cell.
Figure 2C:
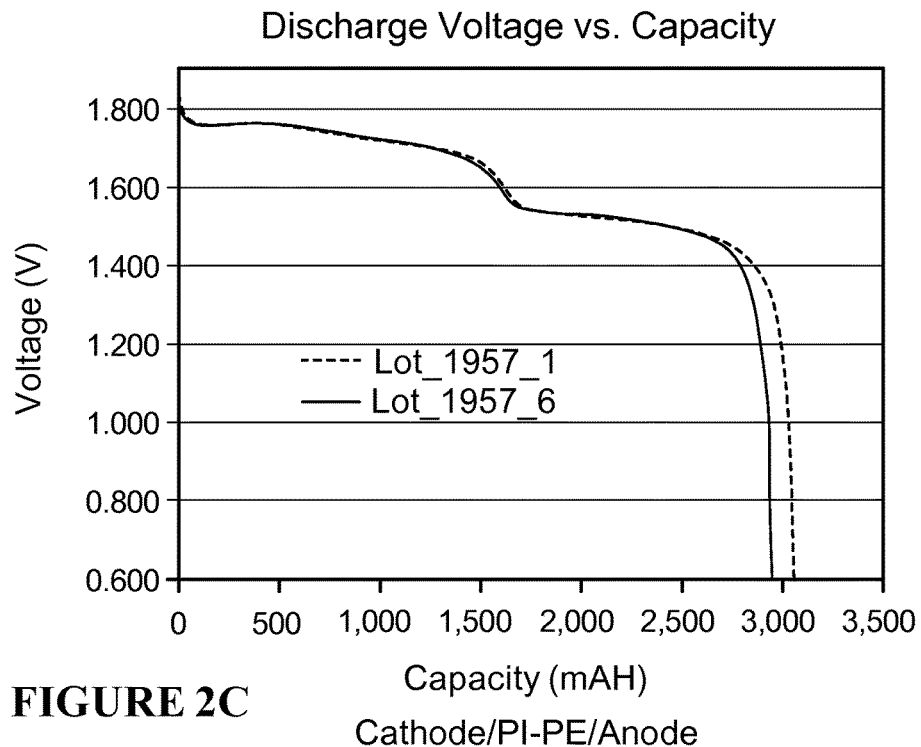
Figure 2D:
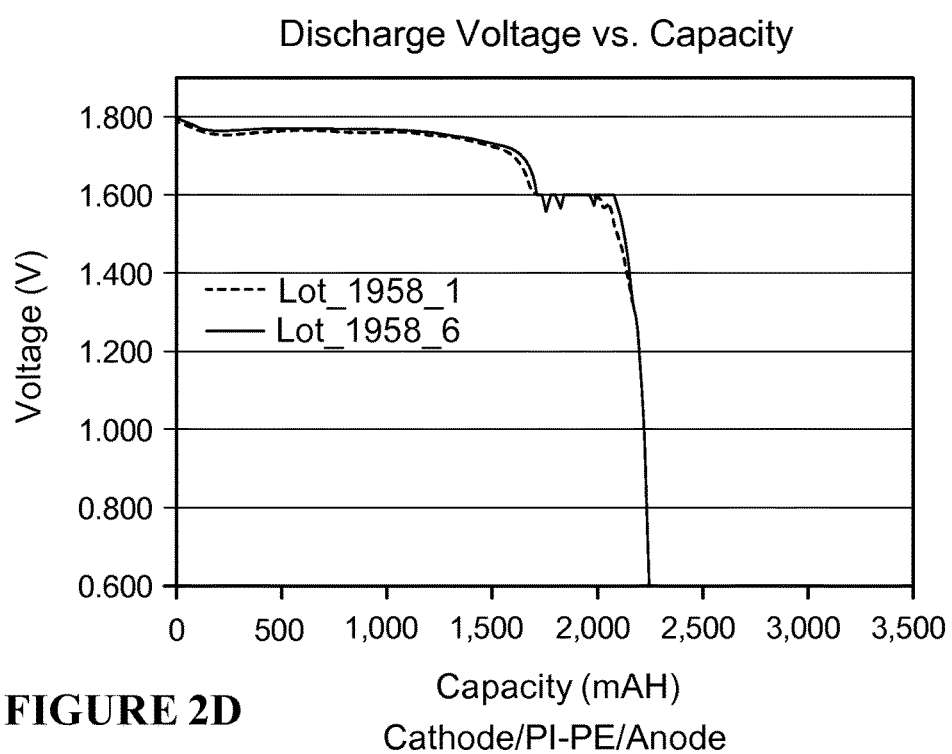

The jellyroll electrode assembly is the preferred configuration in LiFeS$_2$ systems. In order to effectively utilize iron disulfide in this configuration, the iron disulfide is mixed into slurry with the minimal amount of conductors and binders permitted to still effectively discharge the cell. This slurry is then coated and dried on a metallic foil current collector for utilization in the jellyroll, while the lithium is most effectively provided without a current collector. A separator is wound between the electrodes, and liquid, non-aqueous electrolyte is added.

Because the reaction end products of the lithium-iron disulfide electrochemical reaction occupy substantially more volume than the inputs, the electrode assembly swells as the battery discharges. In turn, swelling creates radial forces that can cause unwanted bulging of the cell container, as well as short circuits if the separator is compromised. Previous means of handling these problems include using strong (often thicker) materials for the cell housing and inactive components within the cell, including the separator. However, thicker inactive materials limit the internal volume available and allow for fewer winds possible in the jellyroll, resulting in less surface area between the electrodes and the expectation of comparatively lower performance at higher drain rates. Therefore, there is a tension in lithium-iron disulfide cell design to balance the thickness of the separator against its desired performance and safety characteristics.

In recent years, numerous improved separator materials have been proposed to improve both the performance and safety of electrochemical cells. However, these materials have been almost exclusively focused on rechargeable systems, where traits such as cycling characteristics and electrolyte retention are important. For example, most rechargeable systems have less than 10% electrode expansion and contraction. Additionally, rechargeable systems respond rapidly to a hard internal short, which places an emphasis on the ability of the separator to prevent runaway reactions that are not endemic to the lithium-iron disulfide primary battery chemistry.

In comparison, relatively little effort has been made to create a lithium-iron disulfide cell design and separator which better utilizes and optimizes the advantages inherent to this primary battery system. For example, lithium-iron disulfide cells may generate in excess of 1500 psi of force during discharge (i.e., an amount that is greater than the 10% electrode expansion experienced by rechargeable cells), which is much greater than many rechargeable systems. To further elucidate this point, United States Patent Publication No. 2009/0104520 is incorporated by reference herein.

The hardness of pyrite presents relatively unique puncture concerns, in terms of separator strength. Because the lithium-iron disulfide system reacts to internal shorts slowly (as compared to rechargeable systems) and in such a manner that is control and limit heat generation, a separator which simply by slows or hinders the ionic flow within the cell can be used without requiring as rapid of a shutdown mechanism as in rechargeable cells.

In view of the foregoing, a primary, lithium-iron disulfide battery specifically designed to optimize the advantages and requirements of this electrochemical system is contemplated. The inventors have discovered the interplay of the separator and electrolyte is such that, at extremely high temperatures (typically, temperatures at or exceeding at least 60° C., 71° C. and, in the most extreme case, 90° C.), polypropylene and/or polyethylene microporous membranes no longer provide consistent, reliable discharge service. Accordingly, improvements to each of these elements, as described herein, enable a lithium-iron disulfide battery with improved reliability, discharge capability at extremely high temperatures (as defined above) and overall enhanced safety owing to the elimination of unwanted short circuits that may develop at extremely high temperature, particularly during intermittent, low rate discharge conditions (typically, at or less than 0.10 C, 0.05 C or 0.01 C with discharging intermittently so that the discharge occurs 50% or less of the total time of the test).

In particular, the inventors determined the failure mode at extremely temperature and intermittent, low discharge rates (as defined above) was softening of the separator due to electrolyte absorption at elevated temperature, which can lead to separator penetration by cathode particles due to expansion during discharge. Key evidence used to identify this failure mode is an exothermic response (temperature spike due to formation of a high-resistance internal short) which closely aligns with abruptly dropping cell voltage.

In effect, the inventive cell design balances the tensile strength of the separator, taking into account the effects of temperature and electrolyte solubility, against the pore distribution necessary to sustain acceptable performance of the final battery. Accordingly, any combination of the following elements can be incorporated into a cell design in order to improve and sustain the discharge performance at or above 90° C. of spirally wound lithium-iron disulfide cells a. Non-woven polymeric separators, preferably comprising polyimide, are coupled to a microporous polyolefin separator, preferably comprising polyethylene and/or polypropylene, particularly at 0.01 C, 50% intermittent discharge at 90° C.

b. A liquid electrolyte solution including 20-40 wt % sulfolane. Alternatively, any solvent which displays a high solubility parameter (e.g., at least 25 $(J/cm^3)^{1/2}$ may provide sufficient resilience with respect to the polymeric separator to prevent softening, degradation and/or failure of the separator at the required temperatures.

c. A separator comprising a high temperature polymeric scaffold (i.e., formed with apertures creating voids which penetrate completely through the plane of the separator and occupy at least 50% of the volume occupied by the separator structure), preferably comprising polyimide, coupled with a second separator polymeric material that is soluble or highly absorptive of/in the electrolyte composition and retained in apertures of the scaffold (either thru atomic or molecular bonding, adhesion, ionizing radiation or other cross-linking techniques), to create a two-phase structure having appropriate mechanical and thermal properties wherein the second material forms a continuous, pore-filling phase that provides ionic conductivity and preferably (but optionally) swells when positioned within the aperture.

d. An "asymmetric" separator with multiple, discrete layers having: i) pore sizes in each layer varying so that the across the total thickness and ii) compositions with differing melting points varying in each layer, creating a micro/macro-pore combination that enhances thermal shutdown (with respect to the former) and providing good mechanical strength at extremely high temperatures (with respect to the later). At least one of the other layers can be impregnated (i.e., the pores may be filled) to further enhance ionic conductivity. Preferably, the lower melting point material possesses comparatively smaller pores (relative to the other layer(s)/material(s)) to facilitate the desired thermal shutdown. An optional third layer, preferably identical to one of the others, could be used to create a sandwiched separator structure that allows for more easy impregnation and/or handling of the separator.

An exemplar embodiment of an electrochemical cell design appropriate for the components identified above is illustrated in FIG. 1. Cell 10 is a primary FR6 type cylindrical Li/FeS$_2$ cell. However, it is to be understood that, as described herein, the invention is applicable to other cell types, materials, and constructions, and the description regarding FR6 cells is not intended to be limiting. For example, bobbin-style, prismatic and coin cell constructions, utilizing various known battery chemistries, are or may be amenable to embodiments of the invention.

With reference to FIG. 1, Cell 10 has a housing that includes a container in the form of a can 12 with a closed bottom and an open top end that is closed with a cell cover 14 and a gasket 16. The can 12 has a bead or reduced diameter step near the top end to support the gasket 16 and cover 14. The gasket 16 is compressed between the can 12 and the cover 14 to seal an anode or negative electrode 18, a cathode or positive electrode 20 and electrolyte within the cell 10. The anode 18, cathode 20 and a separator 26 are spirally wound together into an electrode assembly. The cathode 20 has a metal current collector 22, which extends from the top end of the electrode assembly and is connected to the inner surface of the cover 14 with a contact spring 24. The anode 18 is electrically connected to the inner surface of the can 12 by a current collector such as a tab or metal lead 36. The lead 36 is fastened to the anode 18, extends from the bottom of the electrode assembly and is folded across the bottom and up along the side of the electrode assembly in one embodiment. The lead 36 may be welded, or make pressure contact with the inner surface of the side wall of the can 12 as shown. After the electrode assembly is wound, it can be held together before insertion by tooling in the manufacturing process, or the outer end of material (e.g., separator or polymer film outer wrap 38) can be fastened down, by heat sealing, gluing or taping, for example.

An insulating cone 46 can be located around the peripheral portion of the top of the electrode assembly to prevent the cathode current collector 22 from making contact with the can 12, and contact between the bottom edge of the cathode 20 and the bottom of the can 12 is prevented by the inward-folded extension of the separator 26 and an electrically insulating bottom disc 44 positioned in the bottom of can 12.

Cell 10 has a separate positive terminal cover 40, which is held in place by the inwardly crimped top edge of the can 12 and the gasket 16 and has one or more vent apertures (not shown). The can 12 serves as the negative contact terminal. An insulating jacket, such as an adhesive label 48, can be applied to the side wall of the can 12.

Separator

When nonaqueous electrolytes are used, a separator membrane that is ion-permeable and electrically nonconductive should possess at least one of the characteristics identified above. The separator should be capable of retaining at least some electrolyte within the pores of the separator. The separator is disposed between adjacent surfaces of the anode and cathode to electrically insulate the electrodes from each other. Portions of the separator may also insulate other components in electrical contact with the cell terminals to prevent internal short circuits. Edges of the separator often extend beyond the edges of at least one electrode to insure that the anode and cathode do not make electrical contact even if they are not perfectly aligned with each other. However, it is desirable to minimize the amount of separator extending beyond the electrodes.

Suitable separator materials should also be strong enough to withstand cell manufacturing processes as well as pressure that may be exerted on the separator during cell discharge without tears, splits, holes or other gaps developing that could result in an internal short circuit. To minimize the total separator volume in the cell, the separator should be as thin as possible, preferably less than 50 µm thick, and more preferably no more than 25 µm thick, and most preferably as thin as 20 µm or 16 µm. A high tensile stress is desirable, preferably at least 800, more preferably at least 1000, kilograms of force per square centimeter (kgf/cm$^2$). Preferably the average dielectric breakdown voltage exceeds 1000 volts, 2000 volts or most preferably 2400 volts. Preferably the area specific resistance of the electrolyte-separator combination (i.e., measured as a function of the electrolyte selected for the battery) is no greater than 15 ohm-cm$^2$, more preferably no greater than 4.0 ohm-cm$^2$, and most preferably no greater than 2.0 ohm-cm$^2$. Preferably, the mix penetration strength of the separator when immersed in the electrolyte composition intended for the final cell design and heated to at least 60° C. should be greater than 800 psi and more preferably greater than 1000 psi.

During long-term (low rate) discharge, the separator experiences high stress for an extended period in lithium-iron disulfide cells. This pressure can lead to cathode particles penetrating the separator, internally shorting the cell. The rigidity, shape, and upper particle size limit of the cathode particles further exacerbate this concern. Penetration of the separator is a potential cause of imperfect low rate reliability, especially in spirally wound AA and AAA battery sizes, thereby causing cells to exhibit premature voltage dropoff (or PVD, as defined above), wherein the cell voltage drops suddenly and unexpectedly at greater than 50% depth of discharge and is concurrently associated with a rise in cell temperature (above the ambient discharge temperature), at extremely high temperature (i.e., at least 70° C.). In turn, PVD limits battery reliability and can be directly attributed to separator performance. Moreover, selection of electrolyte may soften certain polymeric materials and further exacerbate PVD issues at extremely high temperatures.

Although current microporous separators for nonaqueous cells are almost exclusively polyethylene (PE) and/or polypropylene (PP), the inventors have identified other polymers with improved stability and mechanical strength at high temperatures in the lithium-iron disulfide system. Specifically, polymers should have either high melting point (>200° C.) or display little or no compromise in mechanical strength at high temperature (>150° C.). Separators composed of such polymers may solve the PVD problem encountered during low rate discharge at temperatures above 60° C., and more preferably at or above 90° C.

Among these specialty separators, polyimide (PI) nonwoven separator was selected because of the excellent thermal stability of PI. The basic properties of this PI separator are compared to those of a typical 20 um PE separator used in current prior art batteries (see Table 1). It is clear that the nonwoven PI separator is thermally more stable than the microporous PE separator, but it is more porous and has much larger pore size and lower tensile strength because these two types of separators, made by using different processes, have completely different structures.

TABLE 1

Comparison of properties of nonwoven PI separator and microporous PE separator

| Properties | Nonwoven PI | Micro-porous PE |
|---|---|---|
| Thickness (um) | 22-23 | 20 |
| Porosity | 50-66% | 36-46% |
| Avg. pore size (um) | ~1 | <0.1 |
| Melting point (° C.) | N/A | ~135 |
| Degradation temperature: | >400° C. | |
| Tensile Strength in MD (kg/cm2) | 440 | 760 |

Notwithstanding the desirable properties of nonwoven PI separators, testing demonstrated that PI alone did not solve the PVD problem. The direct cause of lower-than-expected service for the nonwoven PI separator was attributed to large pore size and insufficient thickness. To overcome these deficiencies, the PI separator (or a similar non-woven polymeric separator possessing a majority of the same characteristics of PI identified in table 1 above) is used in combination with a thinner version of a standard microporous separator (e.g., a polyethylene or polypropylene separator similar to those currently in use in commercially available lithium-iron disulfide cells). The two separators can be wound together or bound (e.g., adhesively or chemically) during the regular manufacturing process. The resulting bi-layer separator provides the desired high temperature and drain rate performance.

With respect to bi-layer separators made of nonwoven PI and microporous PE, the overall increase separator thickness necessitated the use of much shorter, thicker electrodes to maintain comparable theoretical, interfacial input capacities in comparison to prior art cells using only the thinner PE separator. The PI layer can be 20 microns, 25 microns, 30 microns, 40 microns or any value therebetween, while the PE layer is preferably 10 microns, 15 microns, 20 microns, 25 microns or any value therebetween. The resulting bi-layer should be between 30 and 75 microns, with the preferred value being between 35 to 40 microns.

For bi-layer separator constructions using PI-PE separators, two different PI-PE orientations were evaluated: PI adjacent to the cathode and PI adjacent to the anode. Discharge curves in FIGS. 2(A) through 2(D) show that the control (single layer of 20 μm PE) had severe PVD whereas both lots with bi-layer separators of PE-PI (regardless of the orientation of the PI layer) delivered the expected discharge capacity without any PVD on 20 mA discharge at 90° C. Conversely, even the "reference" cell using a double layer of PE-PE and electrodes of similar length and thickness to the bi-layer separators still showed PVD.

Additionally, other materials may be used as a scaffold material in combination with a second polymeric filler, as described above. In these cases, the scaffold polymer should have a high melting temperature (e.g., >140° C.), be resistant to chain scission when exposed to ionizing radiation and be insoluble in the selected electrolyte composition and non-reactive with the electrode materials. Potential scaffold materials include polyimide, polyester, polyamide, poly (phthalamide) and/or poly(vinyl chloride). The second pore filling polymer should readily absorb and/or dissolve in the selected electrolyte composition, crosslink upon exposure to ionizing radiation and be capable of solution casting, melt processing or other processes that introduce the polymer into the interstices/pores of the scaffold material. Potential second polymer materials include poly(vinylidene fluoride), polyacrylate and polyethylene copolymers (such as EVA, EAA, etc.).

Laminate materials consistent with the assymetric separator concept described above might include PP, PE, PET, polyester, polyimide, polyamide and other polymers capable of being formed into pores films and/or possessing a higher melting point than microporous PE or PP which would form one of the layered bases in this embodiment. The materials could be laminated, coated or impregnated.

Suitable separators and/or materials having the properties described above may be available from, inter alia, Tonen Chemical Corp. in Kawasaki-shi Japan, Entek Membranes in Lebanon, Oreg., USA; and/or Dupont Chemical Corporation in Circleville, Ohio, USA.

Electrolyte Composition

Irrespective of the cell construction, the electrolyte composition (which typical consists of at least one solute dissolved in at least one organic liquid solvent) has several characteristics. Foremost, it must be compatible with the components of the positive and negative electrodes in order to facilitate the desired electrochemical reactions. Additionally, it must not degrade or react with any internal components of the cell itself.

Absent actual experimentation, it is generally not known how a particular additive dissolved in an electrolyte will behave or react after exposure to and storage in a particular electrochemical cell system. For example, the additive should be stable to both the anode (reductant) and cathode (oxidant), usually for many years and must not substantially diminish cell functionality or additive efficacy. Moreover, strong interactions between components of cells—especially those between the electrolyte and electrode surfaces—often involve complex chemistry that is poorly understood. Thus, electrolytes are a highly unpredictable art, and one cannot generally predict the utility of additives in a particular system in the absence of specific cell testing.

The nonaqueous electrolyte composition in one embodiment of the present invention, contains water only in very small quantities (e.g., no more than about 2,000, or more preferably no more than 500, parts per million by weight, depending on the electrolyte salt being used). Any nonaqueous electrolyte suitable for use with lithium and active cathode material may be used. The electrolyte contains one or more solutes, e.g. electrolyte salts dissolved in an organic solvent. Because the electrolyte is the primary media for ionic transfer in a Li/FeS$_2$ cell, selection of an appropriate solvent and solute combination is critical to optimizing the performance of the cell. Moreover, the solute and solvents selected for the electrolyte must possess appropriate miscibility and viscosity for the purposes of manufacture and use of the resulting cell, while still delivering appropriate discharge performance across the entire spectrum of temperatures potentially experienced by batteries (i.e., about −40° C. to 90° C.).

Miscibility and viscosity of the solvents and the electrolyte is key to the manufacturing and operational aspects of the battery. All solvents used in the blend must be completely miscible to insure a homogeneous solution. Similarly, in order to facilitate high volume production, the solvents should be liquid during manufacture and discharge of the cell and ideally possess a sufficiently low viscosity to flow and/or be dispensed quickly.

Additionally, the solvents and the electrolyte must possess a boiling point appropriate to the temperature range in which the battery will most likely be exposed and stored (e.g., −60° C. to greater than 100° C.). More specifically, the solvent(s) must be sufficiently non-volatile to allow for safe storage and operation of the battery within this stated temperature range. Similarly, the solvents and the electrolyte must not react with the electrode materials in a manner that degrades the electrodes or adversely affects performance of the battery upon discharge.

Suitable organic solvents that have been or may be used in Li/FeS$_2$ cells have included one or more of the following: 1,3-dioxolane; 1,3-dioxolane based ethers (e.g., alkyl- and alkoxy-substituted DIOX, such as 2-methyl-1,3-dioxolane or 4-methyl-1,3-dioxolane, etc.); 1,2-dimethoxyethane; 1,2-dimethoxyethane-based ethers (e.g., diglyme (DG), triglyme (TrG), tetraglyme, ethyl glyme, etc.): ethylene carbonate; propylene carbonate (PC); 1,2-butylene carbonate; 2,3-butylene carbonate; vinylene carbonate; dimethyl carbonate (DMC); diethyl carbonate; ethyl methyl carbonate; methyl formate; γ-butyrolactone; sulfolane (SULF); acetonitrile; N,N-dimethyl formamide: N,N-dimethylacetamide; N,N-dimethylpropyleneurea; 1,1,3,3-tetramethylurea; beta aminoenones; beta aminoketones; methyltetrahydrofurfuryl ether; diethyl ether; tetrahydrofuran (THF); 2-methyl tetrahydrofuran; 2-methoxytetrahydrofuran; 2,5-dimethoxytetrahydrofuran; 3-methyl-2-oxazolidinone; 3,5-dimethylisoxazole ("DMI"); 1-ethoxy-2-methoxypropane; 1,2-dimethoxypropane; and 1,2-dimethoxypropane-based compounds. Additionally, other solvents may act as additives to impart further characteristics upon a particular electrolyte; for example, small amounts of pyridine, triethylamine or other organic bases may be used to control polymerization of the solvent(s). For cells requiring aqueous electrolytes, any number of solutions containing hydroxide (preferably potassium, sodium or lithium hydroxide(s) and the like), chloride (preferably ammonium or zinc chloride and the like) or acid (preferably sulfuric and the like), may be employed.

Salts should be nearly or completely soluble with the selected solvent(s) and, as with the discussion of solvent characteristics above, without any degradation or adverse effects. Examples of typical salts used in Li/FeS$_2$ cells include LiI ("lithium iodide"), LiCF$_3$SO$_3$ ("lithium trifluoromethanesulfonate or lithium triflate"), LiClO$_4$ ("lithium perchlorate"), Li(CF$_3$SO$_2$)$_2$N ("lithium bis(trifluorosulfonyl)imide or lithium imide"), Li(CF$_3$CF$_2$SO$_2$)$_2$N and Li(CF$_3$SO$_2$)$_3$C. Other potential candidates are lithium bis(oxalato)borate, lithium bromide, lithium hexafluorophosphate, and lithium hexafluoroarsenate. Potassium analogs of these salts may also be used, as a partial or complete replacement for their lithium analogs. Two key aspects of salt selection are that they do not react with the housing, electrodes, sealing materials or solvents and that they do not degrade or precipitate out of the electrolyte under the typically expected conditions to which the battery will be exposed and expected to operate (e.g., temperature, electrical load, etc.). It is possible to use more than one solute to maximize certain aspects of performance.

Notably, unless noted to the contrary, the concentration of the solutes relative to the solvents as described herein is best expressed as moles of solute per kilogram of solvent (molality). Molality of a solution remains constant irrespective of the physical conditions like temperature and pressure, whereas the volume of some solvents typically increases with in temperature thereby yielding a decrease in molarity (i.e., moles per liter solution), although this effect is usually small.

Lithium iodide is the preferred solute for primary non-aqueous cells with a cell voltage below 2.8V, although other solutes provided to this solvent blend would be expected to exhibit similar benefits (including but not limited to lithium perchlorate, lithium triflate, lithium imide and the like). The preferred solute concentration is about 0.75 molal.

The inventors have observed that the melting points (MP), especially of common polymers used for making microporous separators such as PE and PP, are around 135° C. and 165° C., respectively. In turn, the thermal shutdown temperature of such separators, which corresponds to the MP of the polymer separator inside the cell, was substantially lower than that of the polymer separator by itself. The interactions between the solvents and polymer could reduce the mechanical strength, soften the polymer matrix, and allow the polymer chains to move more easily under pressure, especially at elevated temperatures. Therefore, through the selection of solvents or solvent blends that interact minimally with PE or PP, PVD may be solved without the need of specialty polymers or very thick PE and PP separators.

Interactions between the polymer and solvents can be quantified using the solubility parameter (δ), which has been defined as the square root of the cohesive energy density and describes the attractive strength between molecules of the material. Materials with similar solubility parameters are likely to be miscible when determined for the same category of hydrogen bonding. When strong hydrogen bonding is present, it is more appropriate the use the following equation for assessing the miscibility of the two organic materials:

$$\delta = \delta_D^2 + \delta_P^2 + \delta_H^2$$

where $\delta_D$, $\delta_P$, and $\delta_H$ account for contributions from dispersion, polar, and hydrogen-bonding interactions, respectively. Miscibility is predicted to be most probable when $\delta_{D,1} \approx \delta_{D,2}$, $\delta_{P,1} \approx \delta_{P,2}$, and $\delta_{H,1} \approx \delta_{H,2}$. In this case, no significant hydrogen-bonding interaction is expected. Thus, the individual components of the solubility parameter (δ) need not be known.

To reduce the swelling of polymers, such as PE and PP, by the solvents at elevated temperatures, the nonaqueous solvents with solubility parameters much higher than that of polymer of the separator are desired. In general, these solvents are polar solvents and/or solvents with boiling point (BP) higher than 85° C. may help overcome the PVD issues at extremely high temperatures. In addition, the use of these high BP solvent should reduce weight loss on thermal cycling tests. Representative solvents are identified in Table 3.

TABLE 3

Solubility parameter, melting point (MP), and boiling point (BP) of solvents evaluated for this project

| Solvent # | Abbreviation | Solvents | Solubility parameters $(J/cm^3)^{1/2}$ | MP (° C.) | BP (° C.) |
|---|---|---|---|---|---|
| 1 | DME | 1,2-Dimethoxyethane | 17.7 | −58 | 84.5 |
| 2 | DIOX | 1,3-Dioxolane | 17.6 | −97.22 | 76.5 |
| 3 | DG | Diglyme, bis(2-methoxyethyl) ether | 19.2 | −64 | 163 |
| 4 | TrG | Triglyme, 1,2-bis(2-methoxyethoxy)ethane | ? | −45 | 216 |
| 5 | THF | Tetrahydrofuran | 18.6 | −108.5 | 66 |
| 6 | CME | Cyclopentyl methyl ether | | | 106 |
| 7 | MTHFFE | Methyl tetrahydrofurfuryl ether | | | 140 |
| 8 | DMC | Dimethyl carbonate | 20.3 | 4.8 | 90 |
| 9 | PC | Propylene carbonate | 27.2 | −54.5 | 242 |
| 10 | DMMP | Dimethyl methylphosphonate | | | 181 |
| 11 | TEP | Triethyl phosphonate | | −56 | 215 |
| 12 | DEEP | Diethyl ethylphosphonate | | N/A | N/A |
| 13 | 3Me2Ox | 3-Methyl-2-oxazolidone | | 15.9 | 88-90/1 mmHg |
| 14 | EMS | Ethyl methyl sulfone | 27.4 | 32-37 | N/A |
| 15 | DMS | Dimethyl sulfone | 29.9 | 109 | 238 |
| 16 | SULF | Tetramethylene sulfone | 27.4 | 27 | 285 |
| 17 | 3MSL | 3-Methyl sulfolane | | N/A | 267 |

Thus, the inventors have found that the melting point of the polymer of the separator in the presence of a solvent can be a convenient and good index for assessing of the interactions between the solvent and the separator. All MP measurements were carried out on a TA differential scanning calorimeter (DSC): model Q2000 at a rate of 10° C./min from room temperature to 220° C., although special equipment may be needed to sustain sufficient pressure for measuring the MP of some polymers in the presence of solvents at temperatures approaching or above their MP.

Figure 3:
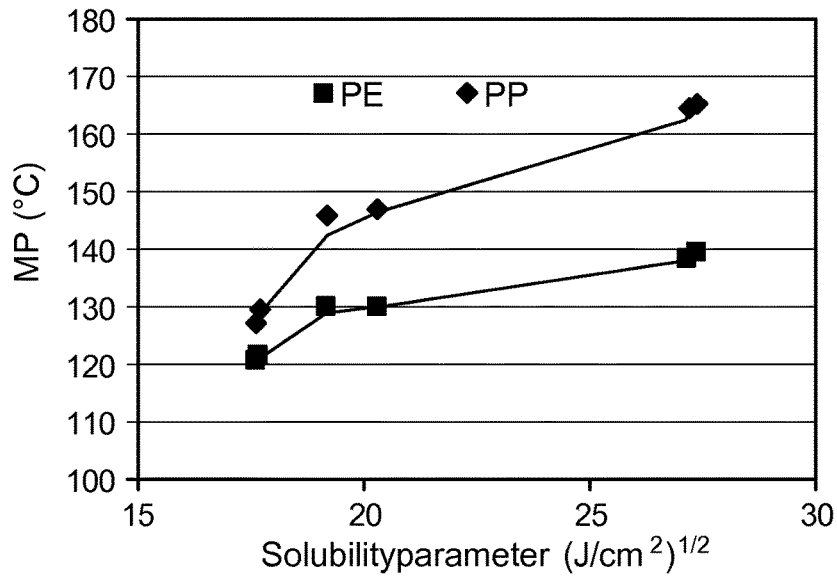
FIG. 3 plots the melting point of polyethylene (PE) and polypropylene (PP) separators in selected solvents having differing solubility parameters.

As an example of this technique, Table 4 shows that while DME, DIOX, and their blends significantly lower the MP of the PE and PP, there are many other solvents that have essentially no effect on the MP of the PE and PP. The addition of the LiI salt had minor effect on increasing the MP of the PE and PP when compared to solvent blend only (an increase of 5° C. for both PE and PP). As expected, the MP of PE and PP separators increased with increasing solubility parameter as shown in FIG. 3.

TABLE 4

MP of PE and PP separator immersed in various solvents

| Solvent/Electrolyte | PE MP (° C.) | PP MP (° C.) |
|---|---|---|
| 65% DIOX:35% DME blend (v/v) | 119 | 130 |
| DIOX | 121 | 127 |
| DME | 122 | 130 |
| 0.75m LiI in 65% DIOX:35% DME blend (v/v) | 124 | 135 |
| 30% DIOX, 70% DG | 128 | 139 |
| DG | 130 | 146 |
| DMC | 130 | 147 |
| 30% DME:70% PC (v/v) | 134 | 156 |
| DEEP | 135 | 154 |
| TEP | 137 | 160 |
| DMMP | 138 | 161 |
| PC | 139 | 165 |
| 3Me2Ox | 139 | 164 |
| EMS | 140 | 165 |

TABLE 4-continued

MP of PE and PP separator immersed in various solvents

| Solvent/Electrolyte | PE MP (° C.) | PP MP (° C.) |
|---|---|---|
| SULF | 140 | 166 |
| Ref. (no solvent) | 137 | 167 |

Figure 4:
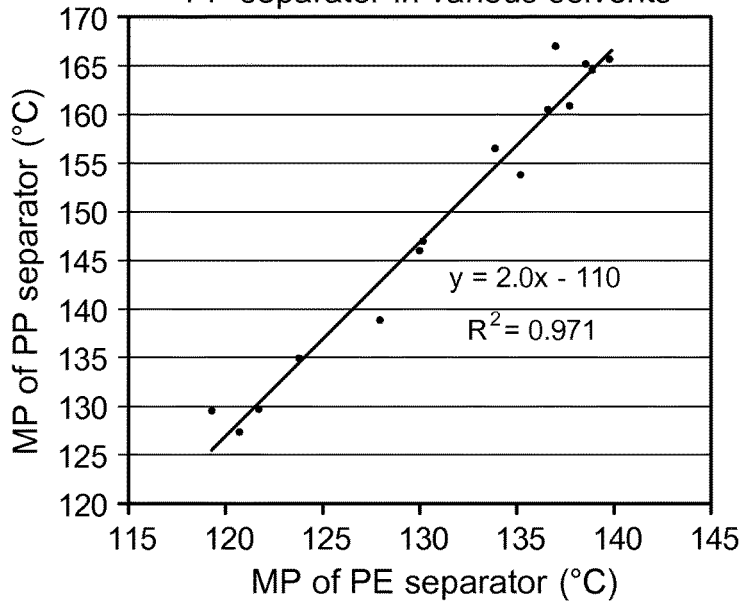
FIG. 4 correlates the melting point of the polyethylene (PE) separators against the melting point of polypropylene (PP) separators from FIG. 3.

For a solvent with a given solubility parameter, reduction of the melting point of PP is double the reduction of the melting point of PE as seen in FIG. 4. Thus, although the MP of dry PP is ~40° C. higher than that of dry PE, it is only ~10° C. higher in the presence of the all-ether electrolytes used in known lithium-iron disulfide cells. This MP may also serve as a proxy for other significant separator traits, such as puncture resistance and mechanical strength.

To maximize MP, electrolyte blends that contain a very large percentage, up to 100%, of the solvents with high solubility parameter are desired. However, these solvents are polar, have higher viscosity, and tend to react more with the lithium anode. Thus, these solvents or solvent blends may have very poor performance on high rate at both room and low temperatures. In other words, there are likely trade-offs in the performance between low rate at high temperature (e.g. 90° C.) and high rate at room and low temperatures when using solvents with high solubility parameters. Therefore, a wide range of the solvent compositions muts be explored to understand these trade-offs after the identification of the promising solvents through the screening experiments.

Figure 5:
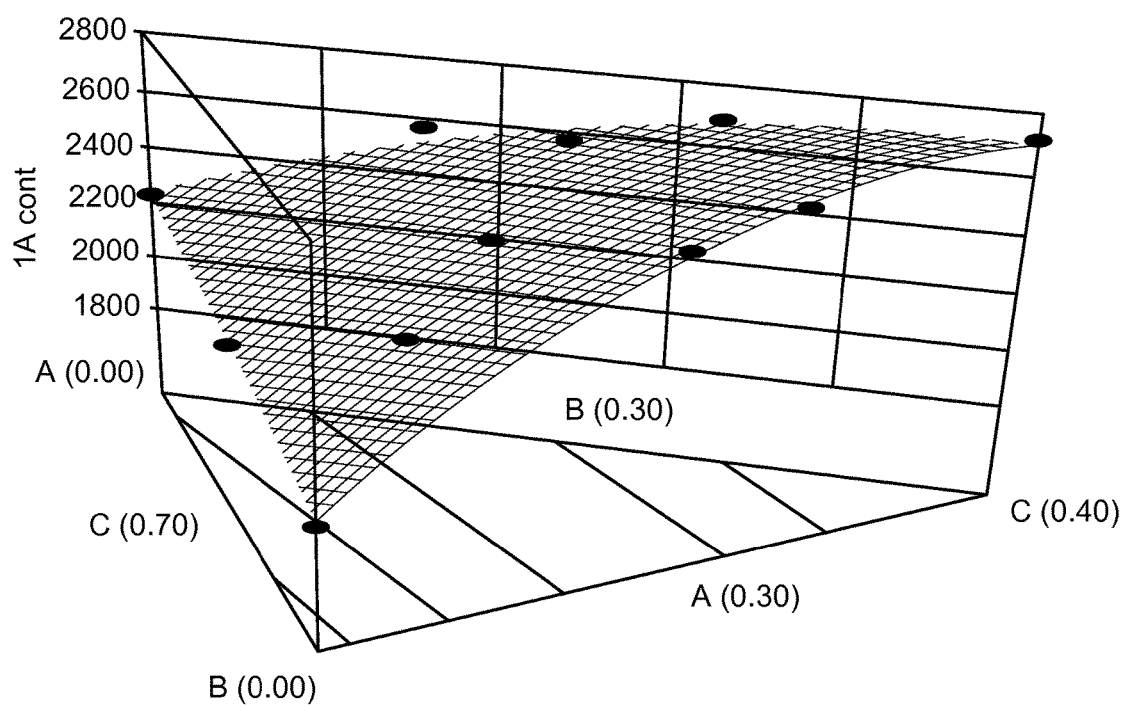
FIG. 5 is a surface response curve for various sulfolane-based electrolytes in lithium-iron disulfide cells discharged at low rate and high temperature, as described below.

On the 20 mA discharge at 90° C., sulfolane (SULF) was a solvent identified as having a positive effect on improving the reliability of the performance. When incorporated into lithium-iron disulfide cells discharged at intermittent, low rate and extremely high temperature, none of the SULF electrolyte compositions experienced significant PVD, as further illustrated in Table 5. In turn, the surface response of the SULF electrolyte compositions is illustrated in FIG. 5, where A represents a 1,2-dimethoxyethane component, B represents a sulfolane component and C represents a 1,3-dioloxane component.

TABLE 5

Cell Performance with SULF-containing electrolytes

| DIOX (vol %) | DME (vol %) | Sulfolane (vol %) | Li imide concentration | Avg. service on 20 mA/90° C. (mAh) | Stdev for 20 mA/90° C. (mAh) | #PVD <90% on 20 mA/90° C. test | Avg. service on 1000 mA/21° C. (mAh) |
|---|---|---|---|---|---|---|---|
| 30% | 20% | 50% | 0.6 m | 2831 | 22 | 0/4 | 2624 |
| 0% | 30% | 70% | 0.6 m | 2828 | 53 | 0/4 | 2225 |
| 25% | 10% | 65% | 0.6 m | 2955 | 70 | 0/4 | 2285 |
| 15% | 15% | 70% | 0.6 m | 2846 | 83 | 0/4 | 2069 |
| 15% | 30% | 55% | 0.6 m | 2941 | 86 | 0/4 | 2561 |
| 25% | 25% | 50% | 0.6 m | 2890 | 38 | 0/4 | 2675 |
| 30% | 30% | 40% | 0.6 m | 2868 | 75 | 0/4 | 2712 |
| 20% | 20% | 60% | 0.6 m | 2865 | 22 | 0/4 | 2413 |
| 30% | 15% | 55% | 0.6 m | 2879 | 57 | 0/4 | 2553 |
| 10% | 30% | 60% | 0.6 m | 2939 | 75 | 0/4 | 2564 |
| 30% | 0% | 70% | 0.6 m | 2925 | 83 | 0/4 | 1907 |
| 20% | 20% | 60% | 0.5 m | 2893 | 87 | 0/4 | 2541 |
| 40% | 40% | 20% | 0.6 m | 2841 | 95 | 0/4 | 2752 |
| 80% | 0% | 20% | 0.6 m | 2833 | 42 | 0/4 | 2322 |

At least 20 vol % SULF is required to remain essentially free of PVD at ≤85% DOD. Although mild shorting was detected in both the control lot and 40 vol % SULF lot, none of the cells tested failed at ≤85% DOD that used SULF-containing electrolyte. In addition to SULF, its derivative 3-methylsulfolane (3MSL) also performed well; however, 3MSL is much more expensive than SULF and does not offer any other advantage on high rate performance, investigation of 3MSL will be discontinued.

Other Cell Components

The cell container is often a metal can with a closed bottom such as the can in FIG. 1. The can material will depend in part of the active materials and electrolyte used in the cell. A common material type is steel. For example, the can may be made of steel, plated with nickel on at least the outside to protect the outside of the can from corrosion. The type of plating can be varied to provide varying degrees of corrosion resistance or to provide the desired appearance. The type of steel will depend in part on the manner in which the container is formed. For drawn cans the steel can be a diffusion annealed, low carbon, aluminum killed, SAE 1006 or equivalent steel, with a grain size of ASTM 9 to 11 and equiaxed to slightly elongated grain shape. Other steels, such as stainless steels, can be used to meet special needs. For example, when the can is in electrical contact with the cathode, a stainless steel may be used for improved resistance to corrosion by the cathode and electrolyte.

The cell cover can be metal. Nickel plated steel may be used, but a stainless steel is often desirable, especially when the cover is in electrical contact with the cathode. The complexity of the cover shape will also be a factor in material selection. The cell cover may have a simple shape, such as a thick, flat disk, or it may have a more complex shape, such as the cover shown in FIG. 1. When the cover has a complex shape like that in FIG. 1, a type 304 soft annealed stainless steel with ASTM 8-9 grain size may be used, to provide the desired corrosion resistance and ease of metal forming. Formed covers may also be plated, with nickel for example.

The terminal cover should have good resistance to corrosion by water in the ambient environment, good electrical conductivity and, when visible on consumer batteries, an attractive appearance. Terminal covers are often made from nickel plated cold rolled steel or steel that is nickel plated after the covers are formed. Where terminals are located over pressure relief vents, the terminal covers generally have one or more holes to facilitate cell venting.

The gasket is made from any suitable thermoplastic material that provides the desired sealing properties. Material selection is based in part on the electrolyte composition. Examples of suitable materials include polypropylene, polyphenylene sulfide, tetrafluoride-perfluoroalkyl vinylether copolymer, polybutylene terephthalate and combinations thereof. Preferred gasket materials include polypropylene (e.g., PRO-FAX® 6524 from Basell Polyolefins in Wilmington, Del., USA) and polyphenylene sulfide (e.g., XTEL™ XE3035 or XE5030 from Chevron Phillips in The Woodlands, Tex., USA). Small amounts of other polymers, reinforcing inorganic fillers and/or organic compounds may also be added to the base resin of the gasket.

The gasket may be coated with a sealant to provide the best seal. Ethylene propylene diene terpolymer (EPDM) is a suitable sealant material, but other suitable materials can be used.

If a ball vent is used, the vent hushing is made from a thermoplastic material that is resistant to cold flow at high temperatures (e.g., 75° C.). The thermoplastic material comprises a base resin such as ethylene-tetrafluoroethylene, polybutylene terephthlate, polyphenylene sulfide, polyphthalamide, ethylene-chlorotrifluoroethylene, chlorotrifluoroethylene, perfluoro-alkoxyalkane, fluorinated perfluoroethylene polypropylene and polyetherether ketone. Ethylene-tetrafluoroethylene copolymer (ETFE), polyphenylene sulfide (PPS), polybutylene terephthalate (PBT) and polyphthalamide are preferred. The resin can be modified by adding a thermal-stabilizing filler to provide a vent bushing with the desired sealing and venting characteristics at high temperatures. The bushing can be injection molded from the thermoplastic material. TEFZEL® HT2004 (ETFE resin with 25 weight percent chopped glass filler), polyphthalamide (e.g., AMODEL® ET 10011 NT, from Solvay Advanced Polymers, Houston, Tex.) and polyphenylene sulfide (e.g., e.g., XTEL™ XE3035 or XE5030 from Chevron Phillips in The Woodlands, Tex., USA) are preferred thermoplastic bushing materials.

The vent ball itself can be made from any suitable material that is stable in contact with the cell contents and provides the desired cell sealing and venting characteristic. Glasses or metals, such as stainless steel, can be used. In the event a foil vent is utilized in place of the vent ball assembly described above (e.g., pursuant to U.S. Patent Application Publication No. 2005/0244706 herein incorporated by reference), the above referenced materials may still be appropriately substituted.

Any number or combination of the aforementioned components may be treated or provided with a coating so as to impart additional desired characteristics to cell. By way of example rather than limitation, the seal member(s) (e.g., the gasket, vent, cell cover, etc.) may be coated with a composition to inhibit the ingress or egress of moisture or electrolyte solvents therethrough. The interior of the container may also be coated to improve cell performance and/or manufacture. To the extent that such coatings or treatments are utilized, it is possible to introduce the contrast agent into the cell as part of this/these coating(s) as an additional or alternative embodiment of the invention, so long as the component containing the contrast agent remains exposed to an internal surface of the cell, thereby allowing dissolution and dispersion of the contrast agent with the electrolyte composition.

Electrodes

The anode comprises a strip of lithium metal, sometimes referred to as lithium foil. The composition of the lithium can vary, though for battery grade lithium, the purity is always high. The lithium can be alloyed with other metals, such as aluminum, to provide the desired cell electrical performance or handling ease, although the amount of lithium in any alloy should nevertheless be maximized. Appropriate battery grade lithium-aluminum foil, containing 0.5 weight percent aluminum, is available from Chemetall Foote Corp., Kings Mountain, N.C., USA.

Other anode materials may be possible, including sodium, potassium, zinc, magnesium and aluminum, either as co-anodes, alloying materials or distinct, singular anodes. Anodes such as carbon, silicon, tin, copper and their alloys, as well as lithium titanate spinel, that have been reported and in some cases commonly used in lithium-ion and other primary or secondary cells can also be used. Ultimately, the selection of an appropriate anode material will be influenced by the compatibility of that anode with electrolyte and performance in the cell. The physical attributes of the alloy may also be important, especially for a spiral wound cell, because the alloy has to have enough flexibility to be wound. The amount that the anode stretches during such winding can also be important. Thus, the physical properties of the alloy need to be matched against the processes used to make the cell.

As in the cell in FIG. 1, a separate current collector (i.e., an electrically conductive member, such as a metal foil, onto which the anode is welded/coated or an electrically conductive strip running along the length of the anode) may not needed for the anode, since lithium has a high electrical conductivity. By not utilizing such a current collector, more space is available within the container for other components, such as active materials. Anode current collectors may be made of copper and/or other appropriate high conductivity metals so as long as they are stable when exposed to the other interior components of the cell (e.g., electrolyte), and therefore also affect cost. Alternatively when the anode is provided in a bobbin-style construction, the current collector may be nail, conductive wire or other similar structure.

In jellyroll and prismatic constructions, the electrical connection should be maintained between each of the electrodes and the opposing terminals proximate to or integrated with the housing. An electrical lead 36 can be made from a thin metal strip connecting the anode or negative electrode to one of the cell terminals (the can in the case of the FR6 cell shown in FIG. 1). When the anode includes such a lead, it is oriented substantially along a longitudinal axis of the jellyroll electrode assembly and extends partially along a width of the anode. This may be accomplished embedding an end of the lead within a portion of the anode or by simply pressing a portion such as an end of the lead onto the surface of the lithium foil. The lithium or lithium alloy has adhesive properties and generally at least a slight, sufficient pressure or contact between the lead and electrode will weld the components together. The negative electrode may be provided with a lead prior to winding into a jellyroll configuration. The lead may also be connected via other appropriate welds.

The metal strip comprising the lead 36 is often made from nickel or nickel plated steel with sufficiently low resistance (e.g., generally less than 15 mΩ/cm and preferably less than 4.5 mΩ/cm) in order to allow sufficient transfer of electrical current through the lead and have minimal or no impact on service life of the cell. A preferred material is 304 stainless steel. Examples of other suitable negative electrode lead materials include, but are not limited to, copper, copper alloys, for example copper alloy 7025 (a copper, nickel alloy comprising about 3% nickel, about 0.65% silicon, and about 0.15% magnesium, with the balance being copper and minor impurities); and copper alloy 110; and stainless steel. Lead materials should be chosen so that the composition is stable within the electrochemical cell including the electrolyte.

The cathode may be ring molded, provided as a pellet or in the form of a strip that comprises a current collector and a mixture that includes one or more electrochemically active materials, usually in particulate form. Iron disulfide ($FeS_2$) is a preferred active material although the invention is applicable to cathode materials such as $MnO_2$, FeS, CuO, $CuO_2$, transition metal polysulfides, nickel oxyhydroxides, oxides of bismuth (e.g., $Bi_2O_3$, etc.), and oxides typically used in lithium on cells (i.e., $LiFePO_4$, $LiCoO_2$, $LiMn_{1/3}Ni_{1/3}Co_{1/3}O_2$, $Li_{1.1}(Mn_{1/3}Ni_{1/3}Co_{1/3})_{0.9}O_2$, $LiNi_{0.8}Co_{0.15}Al_{0.05}O_2$, $LiMn_{1/2}Co_{1/2}O_2$, $LiMn_2O_4$ and the like). Additionally or alternatively, "doped" materials, comprising any one or combination of the aforementioned cathode active materials, with small amounts of various metals or other materials inserted or chemically bonded into the crystalline structure in order to improve the overall performance of the resulting cell, may also be used.

In the preferred $Li/FeS_2$ cell, the active material comprises greater than 50 weight percent $FeS_2$. The cathode can also contain one or more additional active materials mentioned above, depending on the desired cell electrical and discharge characteristics. More preferably the active material for to $Li/FeS_2$ cell cathode comprises at least 95 weight percent $FeS_2$, yet more preferably at least 99 weight percent $FeS_2$, and most preferably $FeS_2$ is the sole active cathode material. $FeS_2$ having a purity level of at least 95 weight percent is available from Washington Mills, North Grafton, Mass., USA; Chemetall GmbH, Vienna, Austria; and Kyanite Mining Corp., Dillwyn, Va., USA. A more comprehensive description of the cathode, its formulation and a manner of manufacturing the cathode is provided below.

The current collector in the preferred cell may be disposed within or imbedded into the cathode surface, or the cathode mixture may be coated onto one or both sides of a thin metal strip. Aluminum is a commonly used material. The current collector may extend beyond the portion of the cathode containing the cathode mixture. This extending portion of the current collector can provide a convenient area for making contact with the electrical lead connected to the positive terminal. It is desirable to keep the volume of the extending portion of the current collector to a minimum to make as much of the internal volume of the cell available for active materials and electrolyte. Additionally or alternatively, it may be possible to rely upon the conductive qualities of the container to act as a current collector.

The cathode is electrically connected to the positive terminal of the cell. This may be accomplished with an electrical lead, often in the form of as thin metal strip or a spring, as shown in FIG. 1, although welded connections are also possible. The lead is often made from nickel plated stainless steel. Still another embodiment may utilize a connection similar to that disclosed in United States Publication No. 2008/0254343, which is commonly assigned to the assignee of this application and incorporated by reference herein. Notably, to the extent a cell design may utilize one of these alternative electrical connectors/current limiting devices, the use of a PTC may be avoided. In the event an optional current limiting device, such as a standard PTC, is utilized as a safety mechanism to prevent runaway discharge/heating of the cell, a suitable PTC is sold by Tyco Electronics in Menlo Park, Calif., USA. Other alternatives are also available.

The above description is particularly relevant to cylindrical Li/FeS$_2$ cells, such as FR6 and FR03 types, as defined in International Standards IEC 60086-1 and IEC 60086-2, published by the International Electrotechnical Commission, Geneva, Switzerland. However, the invention may also be adapted to other cell sizes and shapes and to cells with other electrode assembly, housing, seal and pressure relief vent designs. The electrode assembly configuration can also vary. For example, it can have spirally wound electrodes, as described above, folded electrodes, or stacks of strips (e.g., flat plates). The cell shape can also vary, to include cylindrical and prismatic shapes.

Thus, some embodiments of the invention described herein include electrochemical cells and batteries, as well as methods for manufacturing and using the same, which have at least one of the following characteristics, although additional characteristics and embodiments and combinations are possible based upon the details contained in the disclosure above:

an anode consisting essentially of lithium or a lithium alloy;
a cathode coated onto a solid current collector, said cathode coating comprising iron disulfide as an active material;
a high temperature polymeric separator comprising a polymer having a melting point;
a high temperature polymeric separator having a scaffold structure comprising a first polymer and filling polymer comprising a second polymer;
an electrolyte having a solubility parameter;
a liquid electrolyte that is distinct from the separator;
wherein the anode, the cathode and the separator are spirally wound;
wherein, when the cell is discharged at a rate of 0.01 C or less and a temperature of 70° C. or greater, the solubility parameter of the electrolyte is large enough relative to the melting point of the polymer to prevent premature voltage dropoff;
wherein the separator comprises polyimide;
wherein the separator is a bi-layer further comprising polyethylene;
wherein the polyimide is less than 30 microns, the polyethylene is greater than 10 microns and a total thickness for the bi-layer separator is less than 50 microns; and/or
wherein the first polymer does not soften at an expected discharge temperature for the cell.

In accordance with the patent statutes, the scope of the invention is not limited thereto, but rather by the scope of the attached claims. The examples above are merely considered to be specific embodiments of the invention disclosed herein.

What is claimed:

1. An electrochemical cell comprising:
an anode consisting essentially of lithium or a lithium alloy;
a cathode coated onto a solid current collector, said cathode coating comprising iron disulfide as an active material;
a high temperature polymeric separator having a scaffold structure comprising a first polymer and filling polymer comprising a second polymer, wherein:
the first polymer is selected from: polyimide, polyester, polyamide, poly(phthalamide), or poly(vinyl chloride); and
the second polymer is selected from: poly(vinylidene fluoride), polyacrylate, or a polyethylene copolymer;
an electrolyte consisting of one or more solutes dissolved in one or more liquid solvents, said electrolyte being physically distinct from the separator;
wherein the anode, the cathode and the separator are spirally wound;
wherein the second polymer fills interstices of the scaffold structure and the electrolyte is at least partially absorbed by the second polymer; and
wherein the first polymer does not soften at an expected discharge temperature for the cell.

2. The cell according to claim 1, wherein the first polymer comprises polyimide and the expected discharge temperature is at least 90° C.

3. The cell according to claim 1, wherein the high temperature polymeric separator is configured to impede separator penetration by a portion of the cathode.

4. The cell according to claim 1, wherein the separator has a thickness less than about 50 μm.

5. The cell according to claim 1, wherein the separator has a tensile strength of at least about 800 kgf/cm$^2$.

6. The cell according to claim 1, wherein the separator has an average dielectric breakdown voltage of at least about 1000 volts.

7. The cell according to claim 1, wherein the first polymer has a melting point greater than about 140° C.

8. An electrochemical cell comprising:
an anode consisting essentially of lithium or a lithium alloy;
a cathode coated onto a solid current collector, said cathode coating comprising iron disulfide as an active material;
a high temperature polymeric separator having a scaffold structure comprising a first polymer and filling polymer comprising a second polymer;
an electrolyte consisting of one or more solutes dissolved in one or more liquid solvents, said electrolyte being physically distinct from the separator;
wherein the anode, the cathode and the separator are spirally wound;
wherein the scaffold structure is insoluble in the electrolyte and the filling polymer is soluble in the electrolyte and the filling polymer fills interstices of the scaffold structure and the electrolyte is at least partially absorbed by the filling polymer; and
wherein the scaffold structure does not soften at an expected discharge temperature for the cell.

9. The cell according to claim 8, wherein the first polymer comprises polyimide and the expected discharge temperature is at least 90° C.

10. The cell according to claim 8, wherein the high temperature polymeric separator is configured to impede separator penetration by a portion of the cathode.

11. The cell according to claim 8, wherein the separator has a thickness less than about 50 nm.

12. The cell according to claim 8, wherein the separator has a tensile strength of at least about 800 kgf/cm$^2$.

13. The cell according to claim 8, wherein the separator has an average dielectric breakdown voltage of at least about 1000 volts.

14. The cell according to claim 8, wherein the first polymer has a melting point greater than about 140° C.

\* \* \* \* \*